(12) United States Patent
Nemallan (10) Patent No.: US 10,828,790 B2
(45) Date of Patent: Nov. 10, 2020

(54) COMPONENT FEATURE DETECTOR FOR ROBOTIC SYSTEMS

(71) Applicant: Google LLC, Mountain View, CA (US)

(72) Inventor: Umakaran Nemallan, San Jose, CA (US)

(73) Assignee: Google LLC, Mountain View, CA (US)

( * ) Notice: Subject to any disclaimer, the term of this patent is extended or adjusted under 35 U.S.C. 154(b) by 239 days.

(21) Appl. No.: 15/815,381

(22) Filed: Nov. 16, 2017

(65) Prior Publication Data

US 2019/0143541 A1    May 16, 2019

(51) Int. Cl.
| | | |
|---|---|---|
| B25J 19/02 | (2006.01) | |
| G06N 20/00 | (2019.01) | |
| B25J 9/16 | (2006.01) | |
| G06N 3/04 | (2006.01) | |

(52) U.S. Cl.
CPC .......... *B25J 19/021* (2013.01); *B25J 9/161* (2013.01); *B25J 9/163* (2013.01); *G06N 20/00* (2019.01); *G05B 2219/39271* (2013.01); *G05B 2219/45064* (2013.01); *G05B 2219/45097* (2013.01); *G06N 3/0445* (2013.01)

(58) Field of Classification Search
CPC ........ A47J 36/321; B25J 11/009; B25J 13/02; B25J 19/02; B25J 3/04; B25J 9/0018; B25J 9/0087; B25J 9/163; B62D 57/032; G05B 19/42; G05B 2219/36184; G05B 2219/40116; G05B 2219/40391; G05B 2219/40395

See application file for complete search history.

(56) References Cited

U.S. PATENT DOCUMENTS

| | | | |
|---|---|---|---|
| 7,200,249 B2 | 4/2007 | Okubo et al. | |
| 7,624,085 B2 | 11/2009 | Hawkins et al. | |
| 7,783,447 B2 * | 8/2010 | Co ............................ | B25J 9/16 221/1 |
| 8,108,072 B2 | 1/2012 | Zhao et al. | |

(Continued)

FOREIGN PATENT DOCUMENTS

CN         105988447 A    * 10/2016

OTHER PUBLICATIONS

English Translation: CN105988447A (Year: 2016).*

(Continued)

*Primary Examiner* — Masud Ahmed
(74) *Attorney, Agent, or Firm* — Fish & Richardson P.C.

(57) ABSTRACT

Methods, systems, and apparatus, including computer programs encoded on a computer storage medium, for an object feature identification system employed by a robotic are disclosed. In one aspect, a method includes the actions of generating a data reading of a work area by scanning the work area with a sensor device of the robot; identifying, by processing the data reading through a learning engine, a particular component of a plurality of components associated with the work area based on a task to be performed; identifying, with the machine learning engine, a particular feature of the particular component used in a completion of the task; determining, with the machine learning engine, a particular tool of a plurality of tools of the robot that is configured to perform the task; and performing the task with the particular tool and the particular feature of the particular component.

20 Claims, 5 Drawing Sheets

(56) References Cited

U.S. PATENT DOCUMENTS

| | | | |
|---|---|---|---|
| 8,386,078 B1* | 2/2013 | Hickman | G06F 16/182 |
| | | | 700/245 |
| 9,002,098 B1 | 4/2015 | Chelian et al. | |
| 9,186,793 B1 | 11/2015 | Meier | |
| 9,489,623 B1 | 11/2016 | Sinyavskiy et al. | |
| 9,687,982 B1 | 6/2017 | Jules et al. | |
| 2009/0008351 A1* | 1/2009 | Schneider | B66C 13/063 |
| | | | 212/272 |
| 2009/0132088 A1 | 5/2009 | Taitler | |
| 2010/0286827 A1 | 11/2010 | Franzius et al. | |
| 2016/0059412 A1* | 3/2016 | Oleynik | B25J 19/02 |
| | | | 700/257 |
| 2017/0080566 A1* | 3/2017 | Stubbs | B25J 9/1679 |
| 2017/0291301 A1 | 10/2017 | Ibarz Gabardos et al. | |
| 2017/0352041 A1* | 12/2017 | Ramamurthy | G06N 20/00 |
| 2018/0314936 A1* | 11/2018 | Barik | G06N 5/003 |

OTHER PUBLICATIONS

Artificial Intelligence _ definition in the Cambridge English Dictionary https://dictionary.cambridge.org/us/dictionary/english/artificial-intelligence (Year: 2020).*

PCT International Search Report and Written Opinion issued in International Application No. PCT/US2018/058672, dated Feb. 14, 2019, 15 pages.

PCT International Preliminary Report on Patentability in International Application No. PCT/US2018/058672, dated May 19, 2020, 9 pages.

* cited by examiner

COMPONENT FEATURE DETECTOR FOR ROBOTIC SYSTEMS

TECHNICAL FIELD

This disclosure generally relates to robotic systems and methods, and, more particularly, robotic systems and methods that include machine learning techniques for identifying object features based on an assigned task.

BACKGROUND

Current industrial robotic systems require a complete change to detection programs every time the hardware footprint of a component changes. For example, when a robotic system is designed to place a dual in-line memory module (DIMM), every time the motherboard is updated, the imaging program needs to be reprogramed for the robotic system to continue functioning properly. This applies in general to robotic systems that employ sensor data to identify components and their features (e.g., board fiducial recognition, input/output (I/O) locating, screw/bolt locating, welding points, riveting points, and so forth) used in the completion of assigned tasks

SUMMARY

Implementations of the present disclosure are generally directed to an object feature identification system employed by a robotic system. More specifically, implementations are directed to a system that identifies features of objects (e.g., components) when used by a robotic system in the completion of an assigned task. The system identifies the components and the relevant features by employing a trained Artificial Intelligence (AI) model using one or more machine learning engines applied to scan data received from the robotic system's input modules (e.g., sensors).

In a general implementation, a robot that includes: one or more machine learning engines that include one or more hardware processors; and a non-transitory computer-readable medium storing software and coupled to the one or more machine learning engines, the software including instructions executable by the robot, upon such execution, cause the robot to perform operations including: generating a data reading of a work area by scanning the work area with a sensor device of the robot; identifying, by processing the data reading through the one or more machine learning engines, a particular component of a plurality of components associated with the work area based on a task to be performed; identifying, with the one or more machine learning engines, a particular feature of the particular component used in a completion of the task; determining, with the one or more machine learning engines, a particular tool of a plurality of tools of the robot that is configured to perform the task; and performing the task with the particular tool and the particular feature of the particular component.

In another general implementation, a computer-implemented method executed by a robot that includes one or more machine learning engines that include one or more hardware processors, the method including: generating a data reading of a work area by scanning the work area with a sensor device of the robot; identifying, by processing the data reading through the one or more machine learning engines, a particular component of a plurality of components associated with the work area based on a task to be performed; identifying, with the one or more machine learning engines, a particular feature of the particular component used in a completion of the task; determining, with the one or more machine learning engines, a particular tool of a plurality of tools of the robot that is configured to perform the task; and performing the task with the particular tool and the particular feature of the particular component.

In yet another general implementation, a robotic system, including: a sensor device; one or more machine learning engines, each of the machine learning engines including one or more hardware processors; and one or more memory devices communicably coupled with the one or more machine learning engines, each of the one or more memory devices including tangible, non-transitory, machine-readable media storing instructions, that when executed by the one or more hardware processors, perform operations including: generating a data reading of a work area by scanning the work area with the sensor device; identifying, by processing the data reading through the one or more machine learning engines, a particular component of a plurality of components associated with the work area based on a task to be performed; identifying, with the one or more machine learning engines, a particular feature of the particular component used in a completion of the task; determining, with the one or more machine learning engines, a particular tool of a plurality of tools of the robot system that is configured to perform the task; and performing the task with the particular tool and the particular feature of the particular component.

In an aspect combinable with any of the general implementations, the operations further include, prior to identifying the particular feature: receiving training data that includes data scans of other work areas with other components similar to the identified particular component; and training, with the training data, the one or more machine learning engines to identify features of the other components.

In another aspect combinable with any of the previous aspects, the training data is image data captured from camera sensor devices, wherein the sensor device is a camera sensor device, and wherein the data reading includes image information captured from a field of view of the camera sensor device.

Another aspect combinable with any of the previous aspects, the camera sensor device is an infrared camera device.

In another aspect combinable with any of the previous aspects, the operations further include: retraining the one or more machine learning engines with the data reading of the work area and the identified particular feature of the particular component.

In another aspect combinable with any of the previous aspects, the robot is deployed in a data center.

In another aspect combinable with any of the previous aspects, the particular component is a cable that is freely dangling, wherein the identified particular feature is a trajectory of the cable, and wherein the task includes placing the cable with a mate located on a server.

In another aspect combinable with any of the previous aspects, the robot is deployed in an assembly line to manufacture a product.

In another aspect combinable with any of the previous aspects, the components are parts used in the manufacture of the product, and wherein the task includes attaching at least one of the parts to the product.

In another aspect combinable with any of the previous aspects, the particular component is a motherboard, wherein the particular feature is a DIMM slot, and wherein the task includes slotting a DIMM in the DIMM slot.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference numbers and designations in the various drawings indicate like elements.

DETAILED DESCRIPTION

Technology is rapidly progressing in the areas of industrial automation, robotics, and machine learning. Machine learning is the application of an AI that provides systems, such as a robotic system, the ability to automatically learn and improve from experience or through training data, without being explicitly programmed. As such, machine learning focuses on the development of algorithms and systems that can access data and automatically apply the learnings from it. The application of machine learning to robotic systems has expanded the role of such systems in various application and environments. Such environments may include industrial automation, data centers, and diagnostic/repair systems.

For example, an essential facet of the manufacturing or industrial automation sector is autonomous production methods, which may be powered by robots. These robots can be programmed to complete tasks intelligently with a focus on flexibility, versatility, and collaboration. Industrial robots employed in the manufacturing process are, for example, automated, programmable, and capable of movement. Typical applications of robots include welding, painting, assembly, pick and place for printed circuit boards, packaging and labeling, palletizing, product inspection, and testing, where each task assigned to a robot is accomplished with high endurance, speed, and precision. Some robots are programmed to carry out specific actions with a high degree of accuracy. Other robots are more flexible as to the orientation of the object on which they are operating or even the task that has to be performed to the particular features of the object itself, which the robot may need to identify. These actions are determined by programmed routines that specify the direction, acceleration, velocity, deceleration, and distance of a series of coordinated motions along with the employment of any tools or output modules of the robot. Hence, the ability to detect relevant features of objects, such as component parts, used for a given task performed by a robot within such environments are crucial to the efficiency and precision by which each robot completes assigned tasks.

To achieve robust detection of objects (e.g., components) and their corresponding features, a robot may combine information collected from multiple input devices. For example, a robot may include a machine vision systems acting as its visual sensors, which are linked to internal processors and controllers. Furthermore, a robot may employ an object recognition system to localize and recognize several objects in an assigned work space by aggregating detection evidence across multiple views. Using machine learning, feature-recognition systems may act directly on detailed maps built from data, which may include depth measurements, captured by the input modules.

In view of the foregoing, implementations of the present disclosure are generally directed to methods, apparatus, and systems for object feature recognition within a robotic system deployed to complete a task within an environment. The described recognition system may be utilized by the robotic system to complete an assigned task. For example, the described feature identification system employs a specifically designed machine learning algorithm trained to recognize an object's features, such as screw holes, DIMM slot locations, connectors, fasteners, board fiducials, I/O slots, welding points, riveting points, and so forth. Thus, within a particular task framework, each subtask can proceed without programming changes to the various robotic systems (e.g., the vision system) when there is a change in a component(s) used in the completion of the subtask. The described recognition system may reduce or even completely eliminate, for example, the programming/configuration change lead time necessitated from such a component change.

In example implementations, a robotic system includes one or more machine learning engines that receive data collected from input devices, such as a scanner or camera, regarding various objects within an assigned working area. The collected data is processed by the one or more machine learning engines through a trained AI model to identify relevant features, including the motion, of each object. The one or more machine learning engines may, in some aspects, separate such features into different categories to improve identification and/or location(s) of each feature. In some aspects, the one or more machine learning engines may assign weights to potential features, either within a category of terms, across all categories (or a subset that spans across categories), or both. The derived features may be presented to the internal processors and controllers for use in completing the assigned task of the respective robotic system. In some aspects, the machine learning engines and algorithms of the feature recognition process may rely on algorithmic and parametric modeling within a process that includes a feature recognition schema, one or more machine learning engines configured to create variations, and one or more machine learning engines configured to identify an object's features.

As an example implementation, a robot may be deployed to an assembly line for the manufacture of a computer. The deployed robot may be, for example, responsible for fitting memory chips (e.g, a DIMM) into the memory (e.g., DIMM) slots on a motherboard. When the motherboard component is changed, for example, the deployed robot employs the described machine learning engine(s) and the trained AI models, as is its typical process, to process data received from an input module(s). The received data is processed through the machine learning engines to identify the DIMM slots on the new motherboard component. Once the DIMM slots have been identified, the robot proceeds to slot to the DIMM. Thus, by employing the described system, with the introduction of the new motherboard component into the manufacturing process, the robot does not have to be reprogramed to recognize the DIMM slots (or any other components) on the new motherboard. Instead, by using the machine learning engines and the trained AI models, the robot is able to recognize the location of the DIMM slots on the new motherboard and proceed with completing the assigned task i.e., slotting the DIMM.

As another example implementation, a robot may be deployed in a data center to select and slot cables into, for example, a server. When a cable is freely dangling, it is difficult for robot, through the use of a vision system, to locate, grip, and place the cable with its mate. As the vision system may, for example, not know where to search or how to plot trajectory once a target is identified. However, by employing the described identification system, the target cable is dynamically identified with minimal processing. The described identification system thus avoids manually programing the robot where each feature of the cables is hardcoded and an image recognition algorithm is used to detect feature sets. Other example implementations include automated manufacturing of server trays and/or wall of machines and in automated diagnostics and repair systems, such as, for example, pipeline crack detection and repair.

Figure 1:
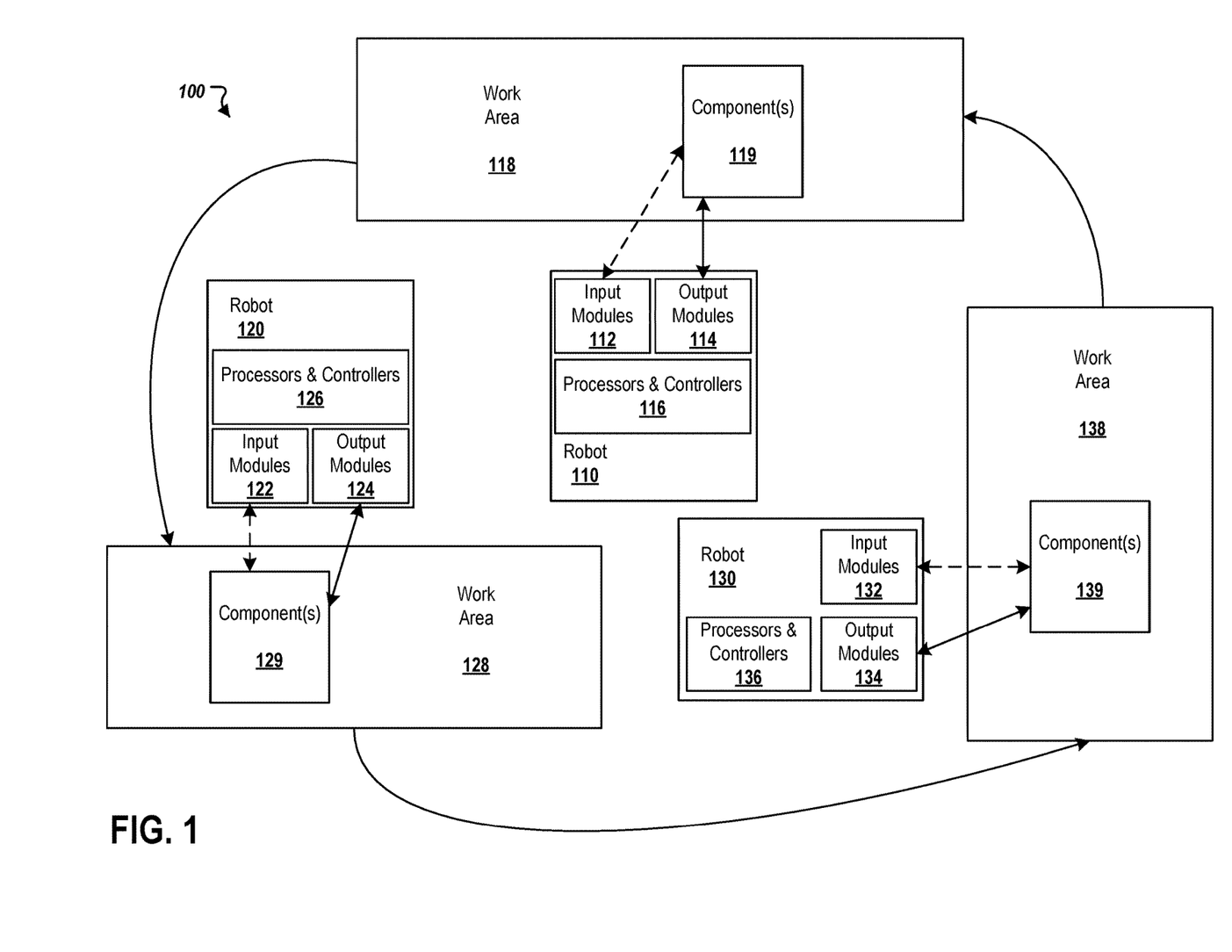
FIG. 1 depicts a block diagram showing an example of environment that employs robotic systems using the described feature identification system.

FIG. 1 provides a block diagram showing an example of environment 100 that employs robots using the described feature identification system. The example environment 100 depicts a manufacturing or industrial automation assembly line, which may be configured to manufacture a product or commodity such as described above. The depicted environment 100 is just one example where the described feature identification system may be utilized. As described above, other environments that make use of robotic systems include, for example, data centers and diagnostic and repair systems.

The example environment 100 includes robots 110, 120, and 130. Each robot 110, 120, and 130 include input modules 112, 122, and 132; output modules 114, 124, and 134; and processors and controllers 116, 126, and 136 respectively. In the depicted example, the robots 110, 120, and 130 are each assigned a respective work area 118, 128, and 138. The work area represents a space where the robot is assigned to complete tasks and where components used by the robot to complete the assigned tasks are located. For example, if the depicted assembly line produces computers, work area 118 may be where memory is slotted on a motherboard, work area 128 may be where chipsets are attached to the motherboard, and work area 138 may be where the motherboard is attached to a housing. Each of the work areas 118, 128, and 138 may have various components (i.e., objects) used by the assigned robot for the completion of tasks. Continuing with the example, work area 118 may include various memory chips to be slotted into the motherboard by the assigned robot 110. Likewise work area 128 may include processors (e.g., Central Processing Units (CPUs)) for the assigned robot 120 to attach to the motherboard and work area 138 may include various computer housings for robot 130 to attached the motherboards. FIG. 1 depicts three work areas/robots in the depicted environment 100; however, any number of work areas/robots may be used in a particular environment depending on, for example, the type of product being manufactured and/or the work assigned to each robot.

Robotics is the integration of computers and controlled mechanisms to make devices, such as robots 110, 120, and 130, reprogrammable and versatile. A robot is a reprogrammable, multi-functional manipulator designed to move material, parts, tools, or specialized devices through variable programmed motions for the performance of a variety of tasks. A robot may generate specific motion of the robot's joints, simultaneously allowing tooling or sensors to perform certain functions. For example, an arm and attached tooling may perform the operations themselves (such as painting) or carry parts to other devices which perform the operations.

Robots, such as robots 110, 120, and 130, may be employed in almost any environment that involves repetitive, difficult, and/or dangerous type tasks. Example task include industrial or production applications such as welding, painting, or surface finishing in, for example, the aerospace or automotive industries. Other example tasks include electronics and consumer products assembly and inspection, inspection of parts, underwater and space exploration, and hazardous waste remediation in, for example, government labs, nuclear facilities, and medical labs. As described above, employing robots 110, 120, and 130 in environment 100 provides advantages for completion of such tasks including flexibility and performance quality.

Robots 110, 120, and 130 may be specially designed for the type of environment to which they are deployed. For example, an industrial robot is a robot system used for manufacturing. Industrial robots may be designed to move materials, parts, and tools, and perform a variety of programmed tasks in the respective manufacturing or production setting. As another example, robots may be used to patrol data centers and to keep track of environmental factors in the data center, such as temperature, humidity, airflow, and asset management. Other tasks that may be assigned to robots deployed to a data center include mapping the data center and slotting cables into server devices. Other example environments include diagnostic and repair robots. Such environments include automotive, aerospace, and construction applications.

Processors and controllers 116, 126, and 136 receive commands (e.g., assigned tasks), process received data, and determine instructions to accomplish the assigned tasks. In some implementations, the processors and controllers 116, 126, and 136 include control software and hardware, application software, interface software, robotic operating systems, and communication protocol Processors and controllers 116, 126, and 136 may use mathematic representations to identify objects and in control algorithms, which may be employed to execute the tasks assigned to the robot and in the integrate sensors, such as input modules 112, 122, and 132 and output modules 114, 124, and 134, into task planning. Processors and controllers 116, 126, and 136 each include one or more machine learning engine systems. Generally, as described more fully herein with FIG. 2, the machine learning engine systems may be trained to receive information regarding the assigned work area collected from the input modules, identify objects (e.g., components) in the work area, and identify the relevant features of each object. The identified features are then employed to determine instructions to complete the assigned task. The instructions are provided to the respective output modules.

In the depicted example, input modules 112, 122, and 132 collect and interpret information from the surrounding environment, which includes the robot's assigned work area, such as work areas 112, 122, and 132. The collected information may be used to identify objects in the assigned work area. The collected information may be processed through the machine learning engines and the trained AI to determine relevant features of each object. Various input modules 112, 122, and 132 may include sensors and corresponding recognition components. Example sensors include acoustical sensors, such as a microphone; light/visual sensors, such as cameras, photoresistors, and, photovoltaic cells, which detect various wavelengths on the light spectrum, such as visual and/or infrared; motion sensors; contact sensors; proximity sensors; distance sensors; pressure sensors; tilt sensors, navigational sensors; acceleration sensors; gyroscopes; voltage sensors; motor feedback sensors; and current sensors.

In some implementations, a fiducial marker or fiducial may be used in the collection of image data by the input modules. A fiducial is an object placed in the field of view of, for example, the imaging system of a robot, and appears in the image produced. The fiducial may be used as a point of reference or a measure and may be placed into or on the imaging subject or a mark or set of marks in the reticle of an optical instrument. Once setup with a fiducial and an algorithm trained through the machine learning engines, each robotic system 110, 120, and 130 can adapt to and make use of the component parts in the robot's respective work area, such as work areas 118, 128, and 138 to complete assigned tasks.

Output modules 114, 124, and 134 serve as the interface to robotic hardware that can be employed to respond to or interact with, for example, components or parts identified in the assigned work areas 118, 128, and 138. Example output modules 114, 124, and 134 include motorized components such as actuators and servos; sound emitters such as speakers and buzzers; electrometric emitters such as light-emitting diodes (LEDs); infrared emitters; robot base controllers; robot arm controllers; motor controllers; and radio frequency emitters. For example, the robots 110, 120, and 130 may have joints to position and/or orient a tool or identified component. Other types of technologies may be integrated with the output modules 114, 124, and 134, such as end-of-arm tooling; special compliance/manipulation devices; welding technologies; optical devices, such as lasers; motors; encoders; tachometers; amplifiers; delivery systems, such as conveyor and part feeders; and so forth.

In some implementations, the robots 110, 120, and 130 may be communicably coupled through a network (not shown). Such a network can include a single large network or combination of networks, such as a local area network (LAN), wide area network (WAN), a cellular network, a satellite network, one or more wireless access points, or any appropriate combination thereof connecting any number of the robots 110, 120, and 130. Furthermore, the robots may be communicably coupled through the network to a backend system, which may include server(s), server cluster(s), and/or virtual server(s). In some implementations, the machine learning engines may be implemented on a server and accessed by the robots 110, 120, and 130 through the network to identify object features.

Figure 2:
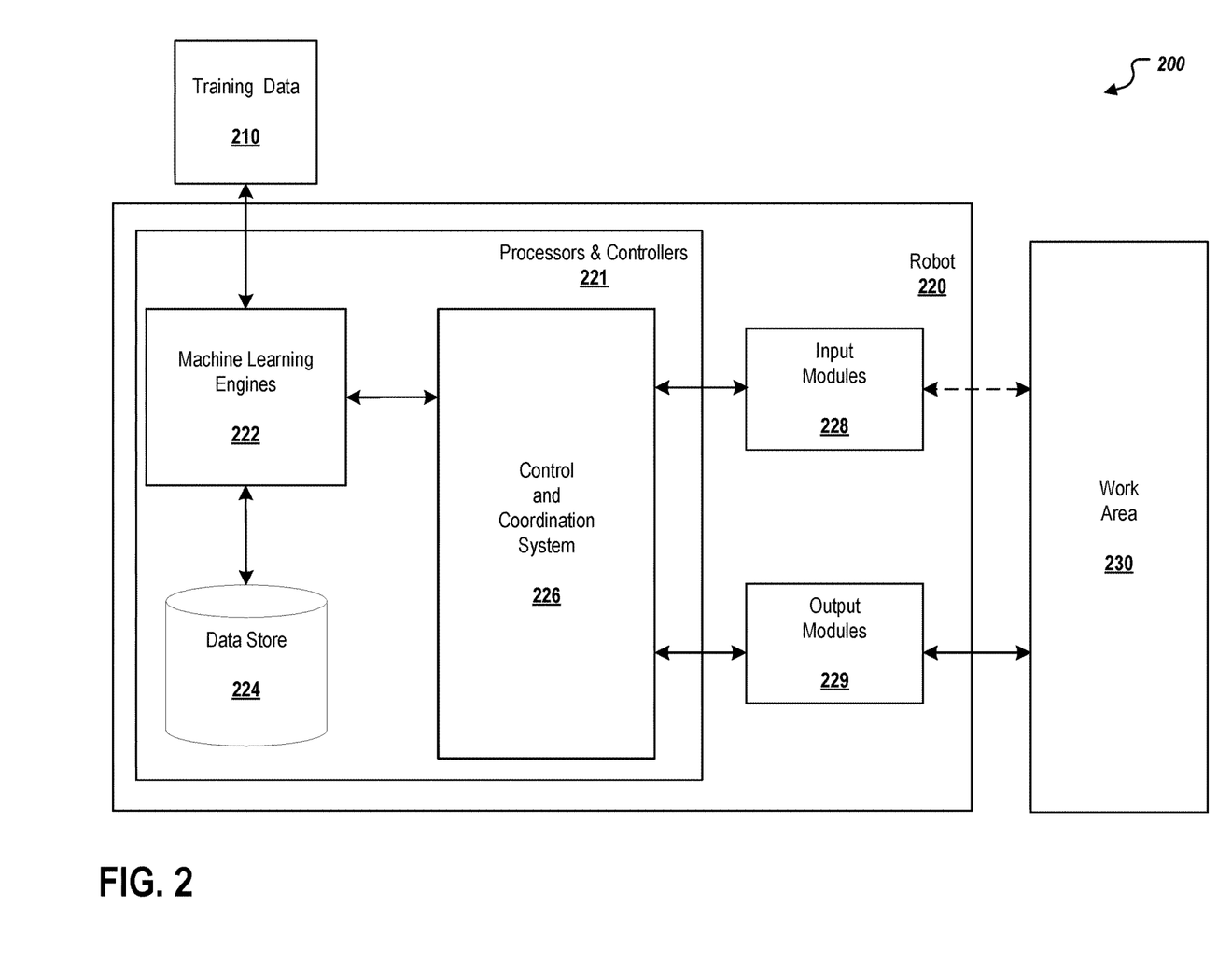
FIG. 2 depicts a block diagram of an example robotic system in accordance with implementations of the present disclosure.

FIG. 2 illustrates, with more specificity, an example implementation 200 of a robot 220 interacting within an assigned environment, such as the example environment 100 shown in FIG. 1. The example implementation 200 includes robot 220 and work area 230. The robot 220 is substantially similar to robots 110, 120, and 130 of FIG. 1 and is assigned to work area 230, which is substantially similar to works areas 118, 128, and 138 of FIG. 1. Robot 220 is assigned to complete various tasks in work area 230 using object (e.g., components) that may be found in the work area. As described above regarding FIG. 1, the type of robot and the tasks assigned to the robot 220, are dependent upon the type of environment and/or the work being performed by the robot 220.

Similar to robots 110, 120, and 130, robot 220 includes processors and controllers 221, input modules 228, and output modules 229, each of which is substantially similar to the components as described in FIG. 1. As shown, processors and controllers 221 includes machine learning engines 222, data store 224, and control and coordination system 226. The control and coordination system 226 determines commands to send to the output modules 229 based on the assigned tasks, the relevant identified component(s) from the assigned work area 230, and the determined features of the identified component. The control and coordination system 226 may also coordinate the data transfer between other operation modules and systems including the machine learning engines 222 of robot 220. Data store 224 is a repository that uses memory locations for persistently storing and managing collections of data. Data store 224 may be implemented as a database or in a simpler format, such as a flat file.

The machine learning engines 222 can be provided as one or more computer executable software modules or hardware modules. For example, in some implementations, the machine learning engines 222 can be provided as one or more software modules. The software modules can be executed by the same computing device or distributed across multiple computing devices included in robot 220. In some implementations, the machine learning engines 222 can be provided as a hardware module in electronic communication with the control and coordination system 226. In some alternative implementations, the control and coordination system 226 and the machine learning engines 210 may be combined into one or more computer executable software modules or hardware modules. The example implementation of the machine learning engines 222 may include one or more processors and one or more memory devices or databases, such as data store 224, that store or otherwise reference the received data.

In some implementations, the machine learning engines 222 include or generate a machine learning model (i.e., an AI model) that has been trained to receive model inputs, such as scan data of the work area generated by the input modules 228, and to generate a predicted output for each received model input to execute one or more processes described in the present disclosure. In some implementations, the machine learning model is a deep model that employs multiple layers of models to generate an output for a received input. For example, the machine learning model may be a deep neural network. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model is a shallow machine learning model, e.g., a linear regression model or a generalized linear model.

In some implementations, the machine learning engines 222 can incorporate training data 210 that is specific to identify features on particular components (i.e., objects), which may be found in a work area, such as work area 230, and employed to complete a robot's assigned task(s). In some implementations, the machine learning engines 222 can obtain specific training data 210 during a training period (e.g., a training mode). For example, the system robot 220 can acquire training data and train a machine learning model of the machine learning engines 222 by, for example, receiving the scan data of the work area 230 generated by the input models 228 and confirming (e.g., through feedback from a systems administrator) that the received scan data has been accurately interpreted, e.g., to identify various relevant features of the objects within the work area 230.

In some implementations, the training data 210 may be global training data (e.g., data sets), which the machine learning engines 222 can incorporate from a population of sources, such as sources accessible through a network or provided by a system administrator. In some implementations, the global training data 210 can be related to particular objects employed in a particular work environment, such as the environments described above. For example, different global training data set can be obtained that are related to components used in the manufacturing of a particular electronic device, such as a computer, or other consumer products. In the case of computer manufacturing, for example, the data set may contain scan data of computer components, such as motherboards, memory chips, processor chips, video cards, audio cards, computer housings, CD ROM drives, and so forth. In some aspects, global training data 210 can be related to components used in particular environments, such as described above (e.g., industrial manufacturing, data centers, diagnostic/repair).

In some implementations, the machine learning engines and data store may be hosted on a server or a hosted third-party and/or cloud based services. In such implementations, robot 220 may communicate through, for example, a network by sending scan data and receiving processed information regarding the identified features. In such implementations, facilitation of communication between the robot 220 and a host machine of the machine learning engines 222 may be through or with an interface (e.g., hardware, software, firmware, or a combination thereof) to the network.

Once the AI model(s) has been trained by the machine learning engines 222, the control and coordination system 226 may send scan data received by the input modules to the machine learning engines 222. The scan data is processed through the trained model to identify object features that are relevant to the robot's 220 assigned task. For example, the scan data may be regarding a new motherboard component that has been placed within the work area to be used in the manufacture of the respective computers. The machine learning engines 222 can identify by employing the trained AI model(s) the various features, such as a DIMM slot, of the motherboard, without retraining for the new component. Once the scan data is processed, the determined information regarding the features of the new component (e.g., the motherboard) may be employed by the control and coordination system 226 to determine commands to send to the output modules 229, which enable robot 220 to complete its assigned task, (i.e., slotting the DIMM into the identified DIMM slots).

Figure 3:
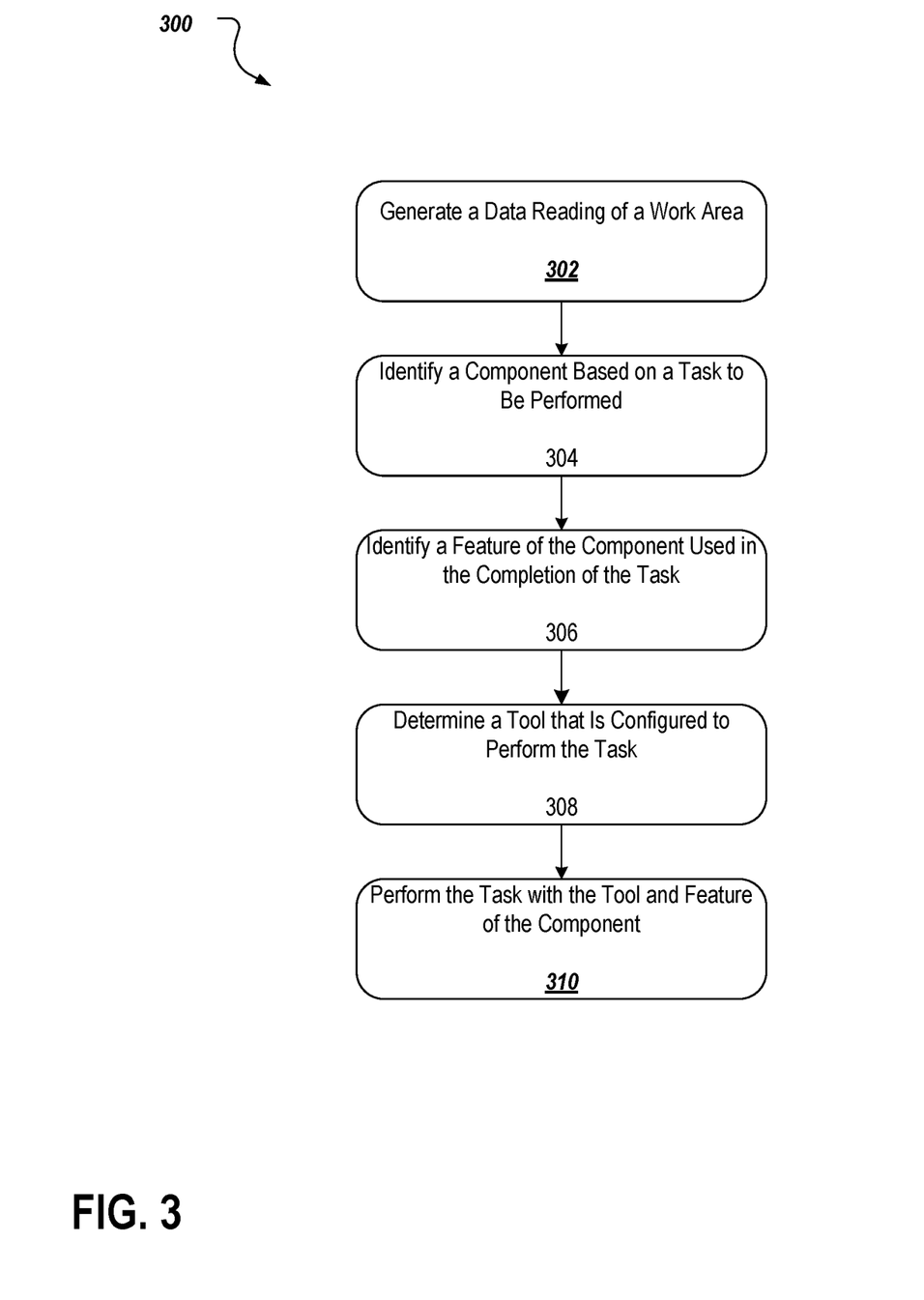
FIG. 3 depicts a flowchart of an example process for identifying features of objects used to complete tasks assigned to a robotic system.

FIG. 3 depicts a flowchart of an example process 300 for identifying features of objects used to complete tasks assigned to a robotic system, such as robots 110, 120, 130, and 220 of FIGS. 1 and 2, in accordance with implementations of the present disclosure. In some implementations, the process 300 can be provided as one or more computer-executable programs executed using one or more computing devices. In some examples, the process 300 is executed by a robotic system such as robots 110, 120, 130, and 220 of FIGS. 1 and 2.

In some aspects, process 300 may begin at step 302, which includes generating a data reading of a work area by scanning the work area with an input module, such as a sensor device, of the robot system. For example, an environment employing robots using the described feature identification system, such as environment 100 as shown in FIG. 1, may be formed to produce an electronic device, such as a computer. Each robotic system deployed into the environment may operate within a work area and be assigned tasks regarding the assembly of particular components of the electronic device or the electronic device itself. For each assigned task, a robot may scan the assigned work area with an input module, such as, for example, taking a three dimensional visual scan of the work area with a camera.

Process 300 may continue at step 304, which includes identifying, by processing the data reading through one or more machine learning engines, a particular component of a plurality of components associated with the work area based on a task to be performed. For example, in some aspects, the robotic system, through the machine learning engine(s), may identify a particular component, such as a motherboard, from the various components in its work area based on the next task the robotic system is to perform. In the described example, the next task may be to slot a DIMM into the DIMM slots on the motherboard.

Process 300 may continue at step 306, which includes identifying, with the one or more machine learning engines, a particular feature of the particular component used in a completion of the task. Continuing with the above example, the robotic system, through the machine learning engine(s), may identify a feature of the identified component, such as a the DIMM slots on the motherboard, that is used to complete the next task. The described feature identification system identifies these component feature(s) that are relevant to the assigned task based on the algorithms trained according to the machine learning engines. As such, in this example, new or different component parts are able to be interjected into the assembly process without having to reprogram the robotic system to identify the features or aspects of the new or different component.

Process 300 may continue at step 308, which includes determining, with the one or more machine learning engines, a particular tool, such as one of the robot's output modules, that is configured to perform the task. Continuing with the particular example, after identifying the DIMM slots of the motherboard, the robotic system may identify and generate commands to employ a mechanical arm (and any other required tools) to attach a DIMM into the DIMM slots.

Process 300 may continue at step 310, which includes performing the task with the particular tool and particular feature of the particular component and the process end. Continuing with the particular example, the robotic system executes the generated commands, which employ the identified tool to complete the assigned task using the particular features of the identified component.

Figure 4:
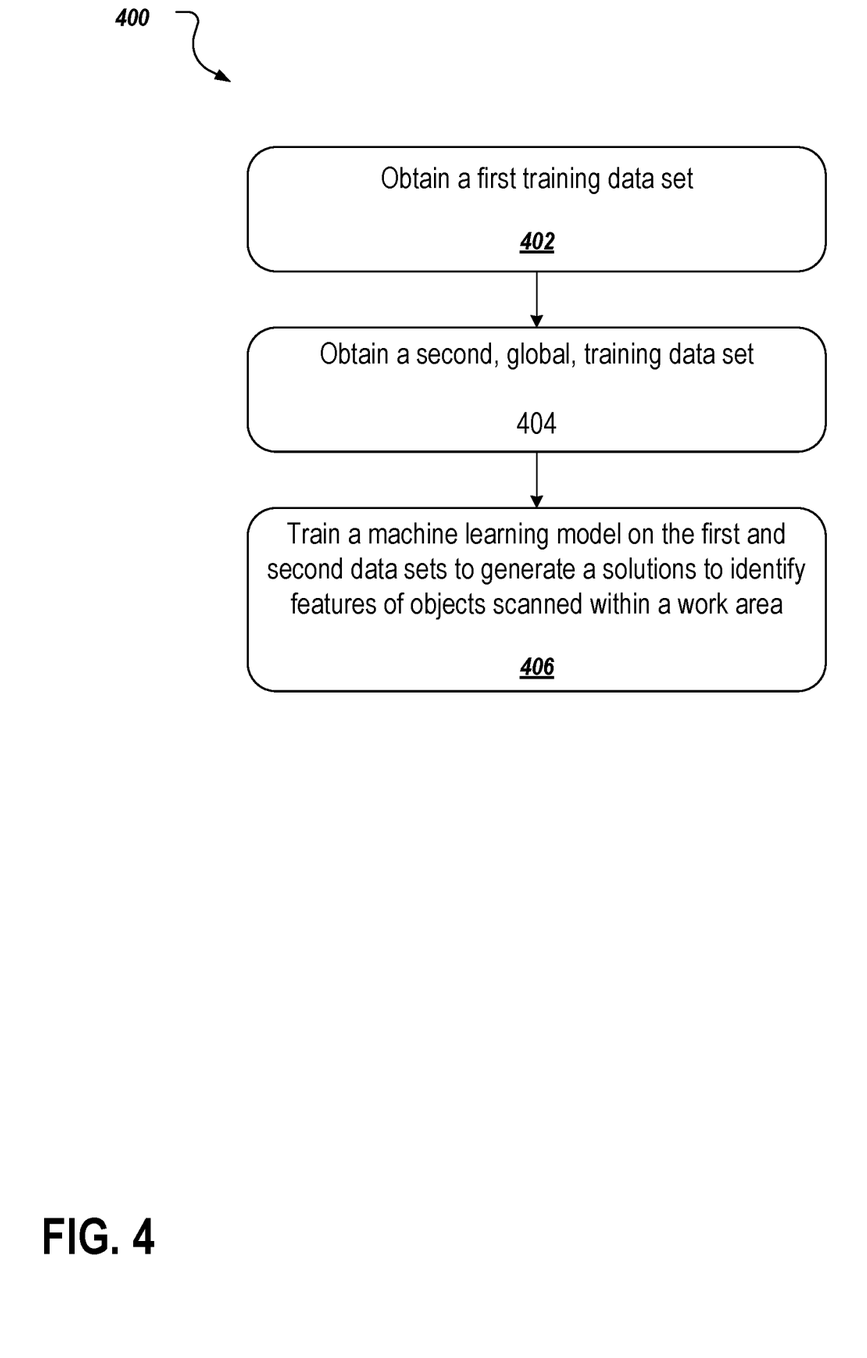
FIG. 4 depicts a flowchart of an example process for training a machine learning model to identify relevant features on an object in accordance with implementations of the present disclosure

FIG. 4 depicts a flowchart of an example process 400 for training a machine learning model to identify relevant features on an object, such as a component or part, used to complete a task assigned to a robot in a particular environment that can be executed in accordance with implementations of the present disclosure. In some implementations, the process 400 can be provided as one or more computer-executable programs executed using one or more computing devices. In some examples, the process 400 is executed by a robot, such as robots 110, 120, 130, and 220 of FIGS. 1 and 2.

The system obtains a first training data set (402). The first training data set can include data scans, which may include visual two-dimensional or three-dimensional images or models, collected from various sensors. The training scan data includes information related to objects, such as components or parts, employed in the completion of tasks assigned to a robot. The information provides details regarding the features of the objects so as to allow the algorithms, once trained, to identify and distinguish features of the object relevant to the completing of tasks. The training scan data can also include information relating to the environment where the robot may find such objects and complete tasks using the objects.

The system obtains a second, global, training data set (404). The second training data set can include data related to the environment to which the robot may be deployed and details regarding various types of objects used to complete tasks in such environments. Such global data may be taken from and/or used by other systems employing the described system. The global training data may also include schematics data of newly developed components relevant to tasks in the respective environment. In some aspects, the multiple different sets of global training data can be used to train the machine learning model.

The system trains a machine learning model on the first and second data sets help generate solutions to identify features of objects scanned within a work area. (406). The machine learning model can be trained on data related to the particular types of objects, data related to the particular types of environments, and/or data related to the particular tasks. In some aspects, the system obtains the first training data set during a training period (e.g., a training mode of a robotic system). In some implementations, the training data includes corrective feedback. For example, during a training mode, the system may receive corrective commands from an administrator user when the system identifies incorrect object features. In some aspects, the machine learning model can be previously validated for a general group of objects relevant to a particular environment, such as for a specific type of part or component used in the manufacture of a particular electronic or other consumer product or a specific type of cable used in a data center. For example, the machine learning model can be initialized with a default initialization that has been tested and validated. Such an initialization process may ensure that the machine learning model has a minimum level of functionality before being delivered to a robot or group of robots deployed into an environment.

Figure 5:
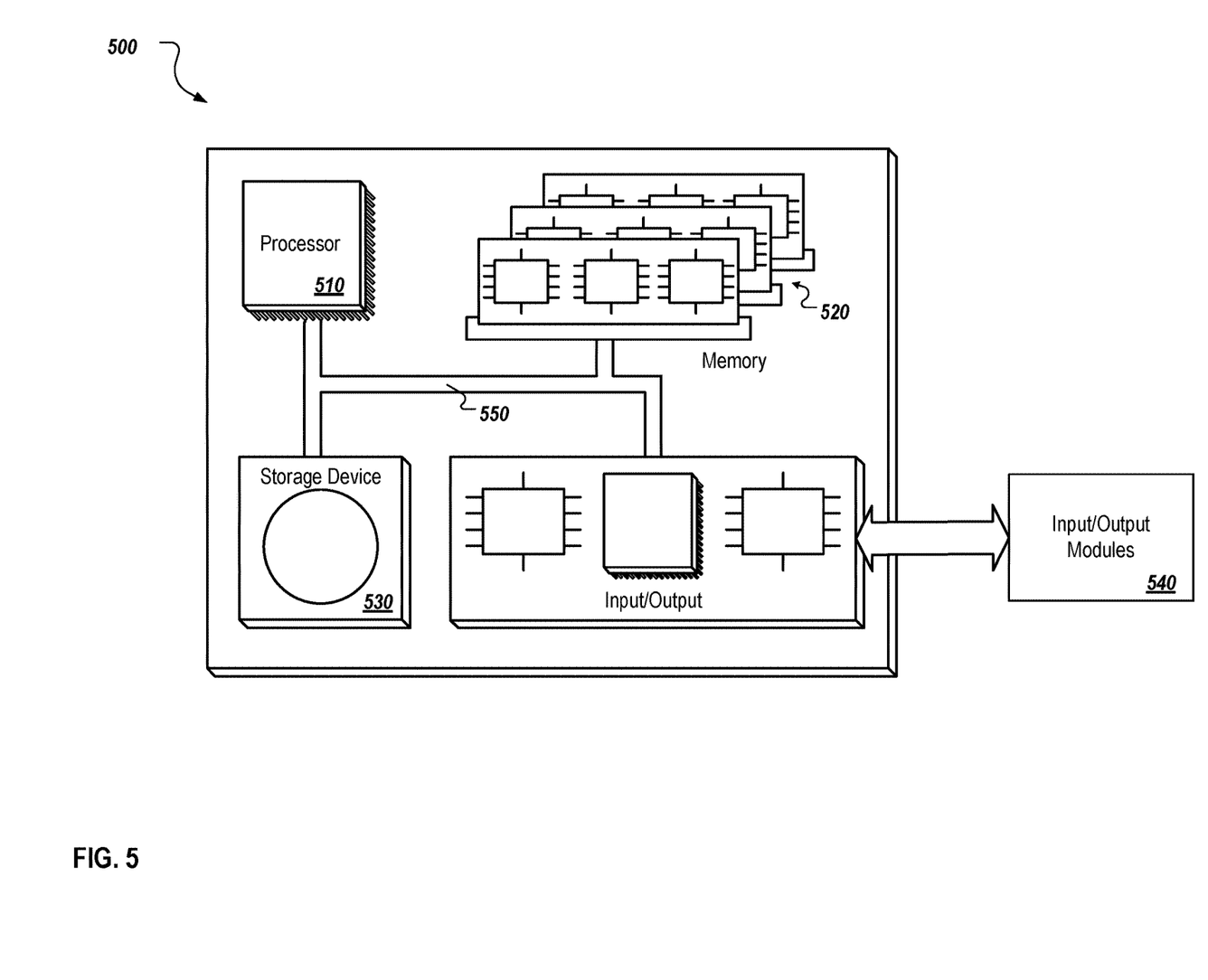
FIG. 5 depicts a schematic diagram of an example computer system.

FIG. 5 is a schematic diagram of an example computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510 (e.g., processor 213), a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by a data center robot that includes one or more machine learning engines that comprise one or more hardware processors, the method comprising:
   generating a data reading of a data center work area by scanning the data center work area with a sensor device of the robot;
   identifying, by processing the data reading through the one or more machine learning engines, a particular data center server component of a plurality of data center server components associated with the data center work area based on a task associated with at least one server to be performed in a data center;
   identifying, with the one or more machine learning engines, a particular feature of the particular data center server component used in a completion of the task associated with the at least one server;
   determining, with the one or more machine learning engines, a particular tool of a plurality of tools of the robot that is configured to perform the task associated with the at least one server;
   performing the task with the particular tool and the particular feature of the particular data center server component; and
   retraining the one or more machine learning engines with the data reading of the data center work area and the identified particular feature of the particular data center server component.

2. The computer-implemented method of claim 1, further comprising:
   prior to identifying the particular feature:
      receiving training data that includes data scans of other data center work areas with other data center components similar to the identified particular data center server component; and
      training, with the training data, the one or more machine learning engines to identify features of the other data center server components.

3. The computer-implemented method of claim 2, wherein the training data is image data captured from camera sensor devices, wherein the sensor device is a camera sensor device, and wherein the data reading includes image information captured from a field of view of the camera sensor device.

4. The computer-implemented method of claim 3, wherein the camera sensor device is an infrared camera device.

5. The computer-implemented method of claim 1, further comprising:
identifying, by processing the data reading through the one or more retrained machine learning engines, the particular data center server component of the plurality of data center server components associated with the data center work area based on a task to be performed.

6. The computer-implemented method of claim 1, wherein the robot is deployed in the data center.

7. The computer-implemented method of claim 6, wherein the particular data center server component is a cable that is freely dangling, wherein the identified particular feature is a trajectory of the cable, and wherein the task includes placing the cable with a mate located on the server.

8. The computer-implemented method of claim 1, wherein the robot is deployed in an assembly line to manufacture a data center server product.

9. The computer-implemented method of claim 8, wherein the plurality of components are parts used in the manufacture of the data center server product, and wherein the task includes attaching at least one of the parts to the data center server product.

10. The computer-implemented method of claim 8, wherein the particular data center server component is a motherboard, wherein the particular feature is a dual in-line memory module (DIMM) slot, and wherein the task includes slotting a DIMM in the DIMM slot of the server.

11. A data center robotic system, comprising:
a sensor device;
one or more machine learning engines, each of the machine learning engines comprising one or more hardware processors; and
one or more memory devices communicably coupled with the one or more machine learning engines, each of the one or more memory devices comprising tangible, non-transitory, machine-readable media storing instructions, that when executed by the one or more hardware processors, perform operations comprising:
generating a data reading of a data center work area by scanning the data center work area with the sensor device;
identifying, by processing the data reading through the one or more machine learning engines, a particular data center server component of a plurality of data center server components associated with the data center work area based on a task associated with at least one server to be performed in a data center;
identifying, with the one or more machine learning engines, a particular feature of the particular data center server component used in a completion of the task associated with the at least one server;
determining, with the one or more machine learning engines, a particular tool of a plurality of tools of the robot system that is configured to perform the task associated with the at least one server;
performing the task with the particular tool and the particular feature of the particular data center server component; and
retraining the one or more machine learning engines with the data reading of the data center work area and the identified particular feature of the particular data center server component.

12. The robotic system of claim 11, wherein the robot system is deployed in the data center, wherein the particular data center server component is a cable that is freely dangling, wherein the identified particular feature is a trajectory of the cable, and wherein the task includes placing the cable with a mate located on the server.

13. The robotic system of claim 11, wherein the robotic system is deployed in an assembly line to manufacture a data center server product.

14. The robotic system of claim 13, wherein the data center server components are parts used in the manufacture of the data center server product, and wherein the task includes attaching at least one of the parts to the data center server product.

15. The robotic system of claim 13, wherein the particular data center server component is a motherboard, wherein the particular feature is a dual in-line memory module (DIMM) slot, and wherein the task includes slotting a DIMM in the DIMM slot of the server.

16. A data center robot comprising:
one or more machine learning engines that comprise one or more hardware processors; and
a non-transitory computer-readable medium storing software and coupled to the one or more machine learning engines, the software comprising instructions executable by the robot, upon such execution, cause the robot to perform operations comprising:
generating a data reading of a data center work area by scanning the data center work area with the sensor device;
identifying, by processing the data reading through the one or more machine learning engines, a particular data center server component of a plurality of data center server components associated with the data center work area based on a task associated with at least one server to be performed in a data center;
identifying, with the one or more machine learning engines, a particular feature of the particular data center server component used in a completion of the task associated with the at least one server;
determining, with the one or more machine learning engines, a particular tool of a plurality of tools of the robot system that is configured to perform the task associated with the at least one server;
performing the task with the particular tool and the particular feature of the particular data center server component; and
retraining the one or more machine learning engines with the data reading of the data center work area and the identified particular feature of the particular data center server component.

17. The robot of claim 16, wherein the operations further comprise, prior to identifying the particular feature:
receiving training data that includes data scans of other data center work areas with other data center server components similar to the identified particular data center server component; and
training, with the training data, the one or more machine learning engines to identify features of the other data center server components.

18. The robot of claim 17, wherein the training data is image data captured from camera sensor devices, wherein the sensor device is a camera sensor device, and wherein the data reading includes image information captured from a field of view of the camera sensor device.

19. The robot of claim 18, wherein the camera sensor device is an infrared camera device.

20. The robot of claim 16, wherein the operations further comprise:
   identifying, by processing the data reading through the one or more retrained machine learning engines, the particular data center server component of the plurality of data center server components associated with the data center work area based on a task associated with at least one server to be performed in the data center.

* * * * *